United States Patent
Graham (10) Patent No.: US 9,523,564 B2
(45) Date of Patent: Dec. 20, 2016

(54) SYSTEM AND METHOD FOR REMANUFACTURING AN ENGINE BLOCK

(71) Applicant: Caterpillar Inc., Peoria, IL (US)

(72) Inventor: Curtis J. Graham, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 135 days.

(21) Appl. No.: 14/609,436

(22) Filed: Jan. 30, 2015

(65) Prior Publication Data
US 2015/0135545 A1    May 21, 2015

(51) Int. Cl.
```
G01B 5/18    (2006.01)
G01B 5/00    (2006.01)
G01B 21/02   (2006.01)
G01B 5/06    (2006.01)
F02F 1/00    (2006.01)
```

(52) U.S. Cl.
CPC ............... *G01B 5/003* (2013.01); *F02F 1/00* (2013.01); *G01B 5/061* (2013.01); *G01B 21/02* (2013.01)

(58) Field of Classification Search
CPC .............................. G01B 5/003; G01B 5/0161
USPC .................... 33/605, 832, 833, 836
See application file for complete search history.

(56) References Cited

U.S. PATENT DOCUMENTS

| | | | | |
|---|---|---|---|---|
| 2,830,375 A | * | 4/1958 | Zwayer | G01B 5/12 29/282 |
| 4,219,936 A | * | 9/1980 | Bridges | G01B 5/24 33/534 |
| 4,288,924 A | * | 9/1981 | Mizuno | G01B 5/12 33/543 |
| 4,372,156 A | * | 2/1983 | Meismer | G01B 5/14 123/41.84 |
| 4,503,619 A | * | 3/1985 | Nelsen | G01B 3/22 33/607 |
| 4,580,446 A | * | 4/1986 | Ansteth | G01M 15/06 116/DIG. 21 |
| 5,007,284 A | | 4/1991 | Slone | |
| 5,077,909 A | * | 1/1992 | Cranor | F01L 1/46 33/607 |
| 5,195,362 A | | 3/1993 | Eason | |
| 5,258,930 A | | 11/1993 | Fukuyoshi et al. | |
| 5,414,941 A | * | 5/1995 | Carpenter | G01B 5/003 33/600 |
| 5,459,940 A | * | 10/1995 | McKenzie | G01M 15/06 33/600 |
| 5,629,479 A | * | 5/1997 | Paulson | G01B 7/14 33/655 |
| 7,581,330 B1 | * | 9/2009 | Redmond | G01B 3/26 33/542 |

(Continued)

*Primary Examiner* — G. Bradley Bennett (57) ABSTRACT

The present disclosure is related to a method of determining a height of an upper surface of an insert relative to a top deck surface of a cylinder block. The method includes detachably coupling a fixture to the top deck surface of the cylinder block. The method also includes disposing a dial gauge on the top deck surface adjacent to each of a plurality of notches defined in the fixture. The method includes inserting a probe of a dial gauge through each of the plurality of notches to contact each of corresponding portions of the upper surface of the insert. The method also includes determining local heights of the upper surface of the insert relative to the top deck surface at the corresponding portions of the upper surface. The height of upper surface of the insert relative to the top deck surface is determined based on the local heights.

1 Claim, 7 Drawing Sheets

(56) References Cited

U.S. PATENT DOCUMENTS

| | | | |
|---|---|---|---|
| 2006/0021870 A1 | 2/2006 | Tsai et al. | |
| 2012/0304477 A1* | 12/2012 | Zhang | G01B 3/28 33/701 |
| 2013/0167392 A1* | 7/2013 | Boyer | G01B 3/14 33/562 |
| 2014/0157611 A1* | 6/2014 | Wada | G01B 3/26 33/611 |
| 2015/0105212 A1* | 4/2015 | Graham | B23P 6/00 475/331 |

* cited by examiner

SYSTEM AND METHOD FOR REMANUFACTURING AN ENGINE BLOCK

TECHNICAL FIELD

The present disclosure generally relates to a system and a method for remanufacturing an engine block,—and more particularly to a method of verifying a height of an insert placed around the cylinder bore in relation to a deck surface of the engine block.

BACKGROUND

Typically components of a machine such as, an internal combustion engine are subject to loads and abrasion during operation thereof. One such machine component, for example, is a cylinder block, which may experience loads from combustion events occurring within combustion chambers formed by a cylinder head, pistons, and cylinder bores. These events may subject the cylinder block to loads and abrasion, thereby causing wear on one or more surfaces of the cylinder block. Additionally, prolonged operation of the machine may also cause wear to one or more surfaces of the cylinder block.

Such cylinder blocks are generally remanufactured by machining portions having wear and installing inserts in the machined portions typically at the site of the cylinder bore where it meets a deck surface of the block. In some cases, the inserts may become displaced or "drop" typically during subsequent machining or assembly processes. Once the engine is assembled and should the insert not be at the same level as the deck surface, the combustion within the cylinder bores or chambers may not be sealed which may lead to loss in performance or shortened engine life. Typically, the proper placement of the insert is verified only after installation of the cylinder liner assembly. As a result the insert may not be in place and if detected several parts would need to be removed to access the insert.

U.S. patent publication No. 2006/021870 (the '870 publication) relates to a method of refurbishing a deposition target having a surface with an eroded region. The method involves measuring a depth profile of the eroded region. A target material is then provided to the eroded region in relation to the measured depth profile to refurbish the target by filling the eroded region with the target material.

However the '870 publication requires a motor and magnetic field generator setup, which increased production cost. Therefore, a cost effective and easy to install solution is needed to accurately measure the insert height.

SUMMARY OF THE DISCLOSURE

In one aspect of the present disclosure, a method of determining a height of an upper surface of an insert relative to a top deck surface of a cylinder block of an engine is provided. The insert is disposed in a counterbore formed adjacent to an end of a cylinder bore defined in the cylinder block. The method includes detachably coupling a fixture, via fasteners, to the top deck surface of the cylinder block. The fixture is configured to apply a force on the upper surface of the insert in the coupled position. The method also includes disposing a dial gauge on the top deck surface adjacent to each notch of a plurality of notches defined in the fixture. The plurality of notches is circumferentially spaced on the fixture to allow access to corresponding portions of the upper surface of the insert. The method includes inserting a probe of a dial gauge through each notch of the plurality of notches to contact each of the corresponding portions of the upper surface of the insert. The method also includes determining, via the dial gauge, local heights of the upper surface of the insert relative to the top deck surface at the corresponding portions of the upper surface. The method further includes determining the height of upper surface of the insert relative to the top deck surface based on the local heights.

Other features and aspects of this disclosure will be apparent from the following description and the accompanying drawings.

DETAILED DESCRIPTION

Wherever possible, the same reference numbers will be used throughout the drawings to refer to same or like parts. As best show in FIG. 1 the cylinder block 100 may form part of an engine (not shown), such as a compression ignition engine, a spark-ignition engine, or other combustion engines known in the art. Such an engine, which includes the cylinder block 100, may be used to power various types of machines, such as, but not limited to, on-highway vehicles, off-highway vehicles, earthmoving machines, stationary equipment, or any other machines known in the art.

Figure 1:
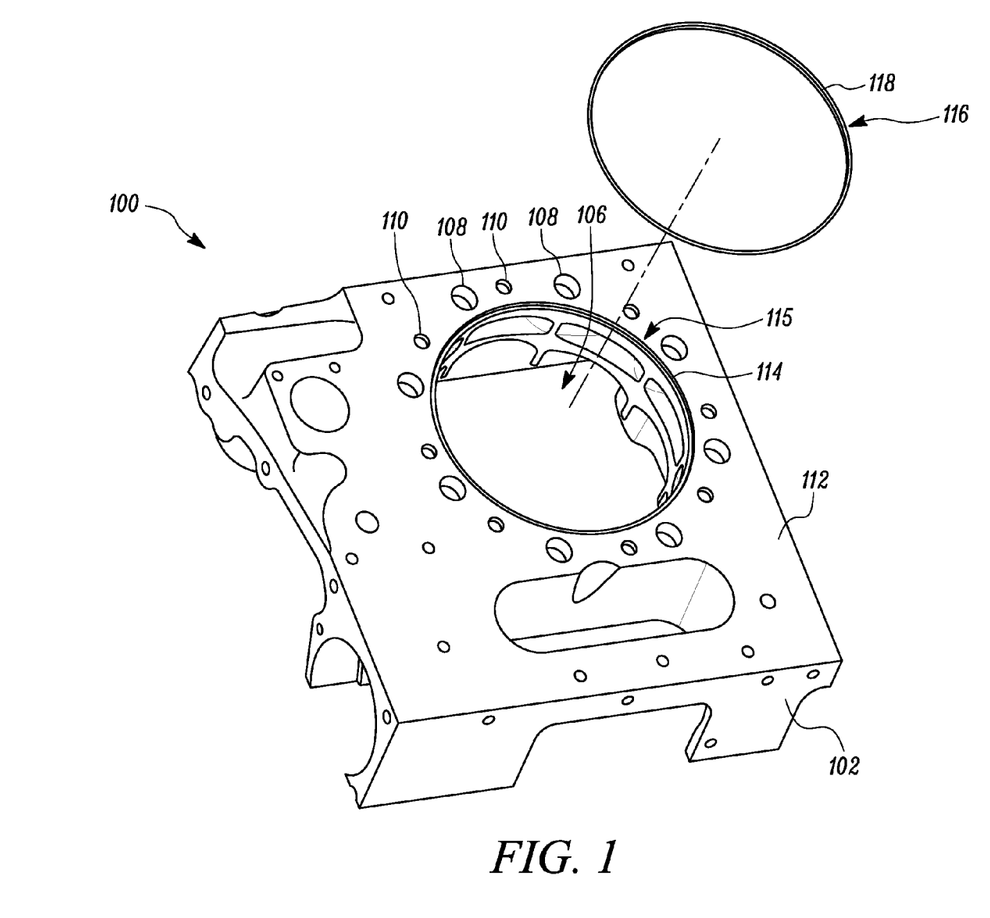
FIG. 1 is a partial exploded view of an exemplary cylinder block of an engine having a counterbore along with an insert.

The cylinder block 100 includes an upper section 102 and a lower section (not shown). The upper section 102 defines a plurality of cylinder bores 106 (only one shown) therein. Further, the cylinder bores 106 open through a top deck surface 112 of the upper section 102. Each of the cylinder bores 106 are structured to slidably receive a piston (not shown) therein. One cylinder bore 106 is shown for illustration purposes. However it should be recognized that the cylinder block 100 may include any number of cylinder bores 106, each of which may or may not include a cylinder liner (not shown).

The upper section 102 may also define a variety of other openings, such as fluid passages 110, and attachment bores 108. The fluid passages 110, such as coolant passages, may be circumferentially spaced about each cylinder bore 106.

Each fluid passage 110 may be formed within the cylinder block 100 and may open through the top deck surface 112, as shown in FIG. 1. The fluid passages 110 may be configured to provide cooling of the cylinder block 100, or components thereof.

The engine (not shown) includes a cylinder head (not shown) that may be attached to the upper section 102 of the cylinder block 100 via, a plurality of attachment bolts (not shown). The attachment bolts may be received within the corresponding attachment bores 108. The cylinder head may enclose each of the cylinder bores 106, thus creating combustion chambers therein, and may provide a structure for supporting intake and exhaust valves and/or ports, fuel injectors, necessary linkages, and/or other known devices or structures.

The lower section of the cylinder block 100 may include a crank case (not shown) defining a crank bore (not shown). The crank bore may be structured to rotatably receive a crankshaft (not shown) therein.

A person or ordinary skill in the art will acknowledge that the cylinder block 100, as shown in FIG. 1, is purely exemplary in nature and variations may be possible without deviating from the scope of the present disclosure. Further, various details of the cylinder block 100, such as the lower section, intake ports, exhaust ports, are not shown in FIG. 1 for illustrative purposes. Moreover, the cylinder block 100, as described above, may be used with any type and/or configuration of an internal combustion engine.

The engine including the cylinder block 100 may experience loads due to combustion events occurring within the combustion chambers. In particular, during operation of the internal combustion engine, the machine component may experience abrasion and loads due to vibrations, high temperature, and the like. Such loads and abrasion may result in erosion, corrosion and/or wear within the cylinder block 100, particularly on the top deck surface 112.

Figure 2:
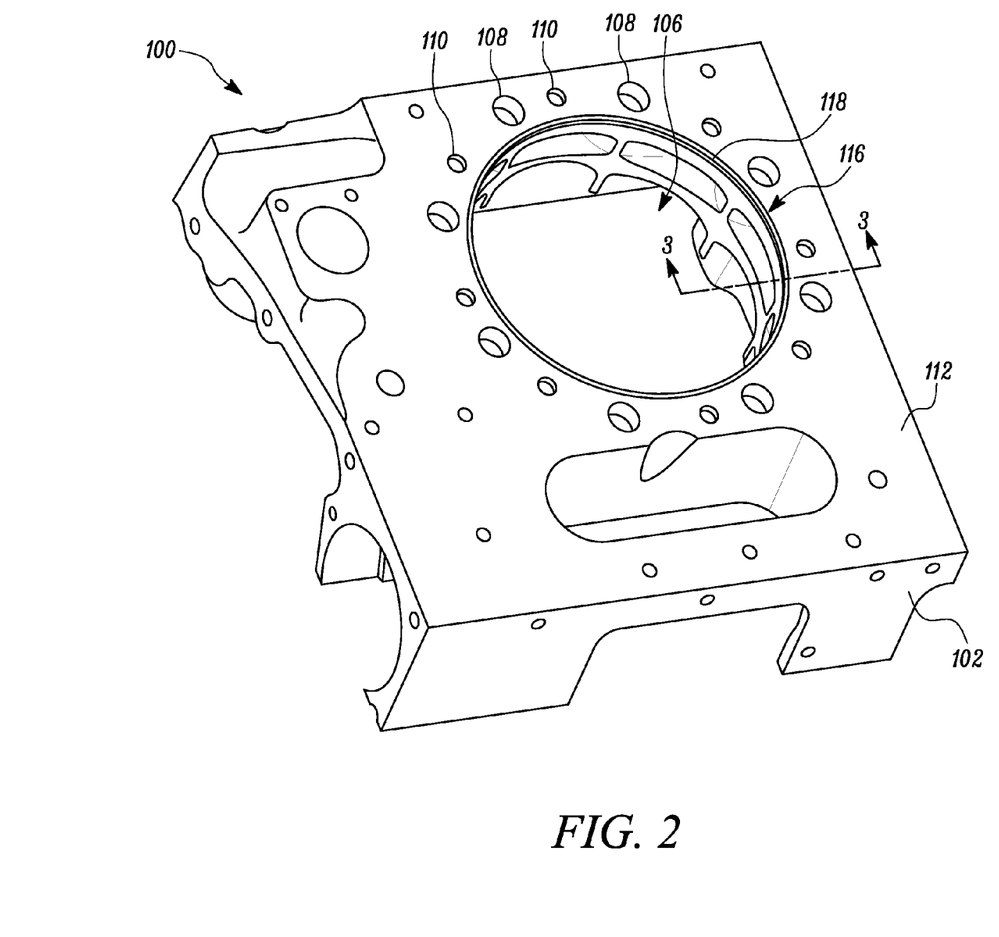
FIG. 2 is a partial perspective of the cylinder block of FIG. 1 with an insert received within the counterbore.

In a typical remanufacturing process, a counterbore 114 may be formed around a worn portion of cylinder bore 106. In FIG. 1 of the illustrated embodiment, the counterbore 114 is formed adjacent to an end 115 of the cylinder bore 106. Further, an insert 116 is disposed in the counterbore 114. In various other embodiments, the counterbore 114 may be formed on other worn portions of the machine component. In an example, the counterbore 114 may be formed by machining As shown in FIG. 1, the insert 116 may have a substantially annular shape. FIG. 2 illustrates the insert 116 disposed in the counterbore 114. In an embodiment, the insert 116 may be press-fitted within the counterbore 114. However, various alternative methods may also be used to couple the insert 116 to the counterbore 114, for example, welding, adhesives, and the like. After installation of the insert 116, one or more machining operations may be performed to on the insert 116 and the top deck surface 112 to ensure that the top deck surface 112 is flush with an upper surface 118 of the insert 116. Such machining operations may also be performed on other portions of the cylinder block 100.

Figure 3:
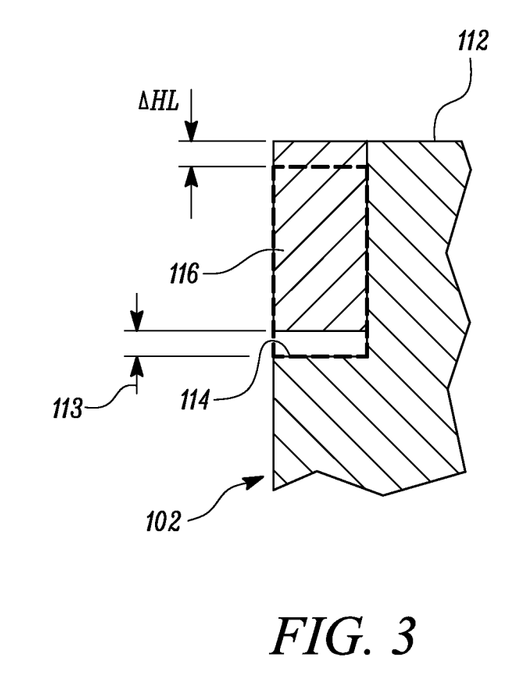
FIG. 3 is a partial sectional view of the insert placed within the counterbore taken along line 3-3 of FIG. 2.

FIG. 3 illustrates a sectional view of the insert 116 placed within the counterbore 114. In an ideal position (represented by dashed lines), the insert 116 may be seated on the counterbore 114. However, a gap 113 may be present between the base of the insert 116 and the counterbore 114. The gap 113 may be due to various reasons, such as, but not limited to, manufacturing tolerances, improper insertion, and movement during the machining operations performed on the insert 116 and the top deck surface 112. Further, an upper portion of the insert 116 may be machined flush with the surrounding top deck surface 112 during the machining process. Hence, in case the insert 116 is displaced downwards during assembly of the cylinder block 102 with the cylinder head, a local height difference $\Delta H_L$ may result between the insert 116 and the top deck surface 112.

Figure 4:
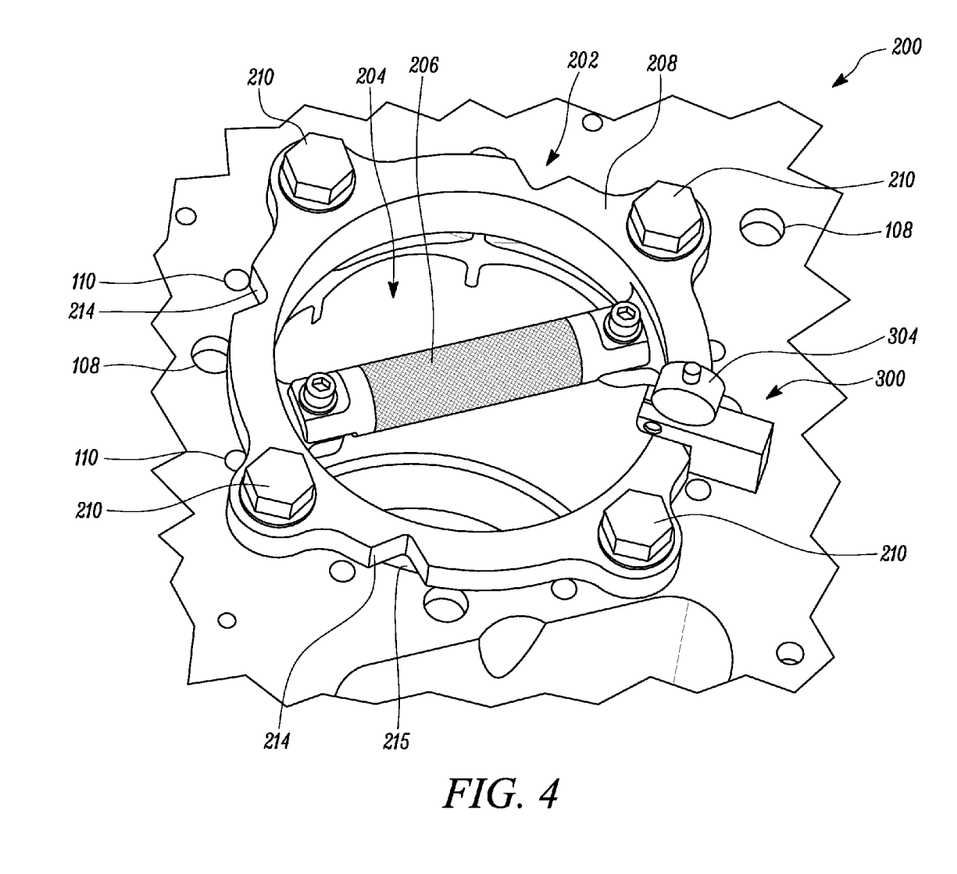
FIG. 4 is a partial perspective view of a system disposed on the cylinder block of FIG. 1, according to an embodiment of the present disclosure.
Figure 5:
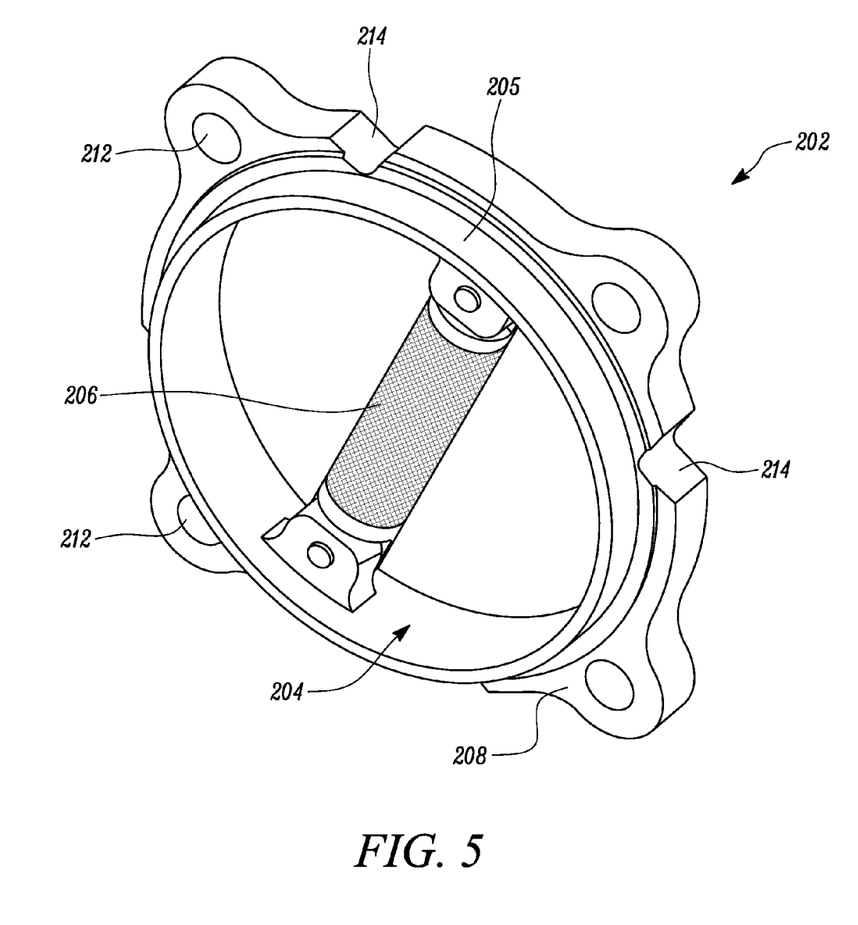
FIG. 5 is a perspective view of a fixture of the system of FIG. 2, according to an embodiment of the present disclosure.
Figure 6:
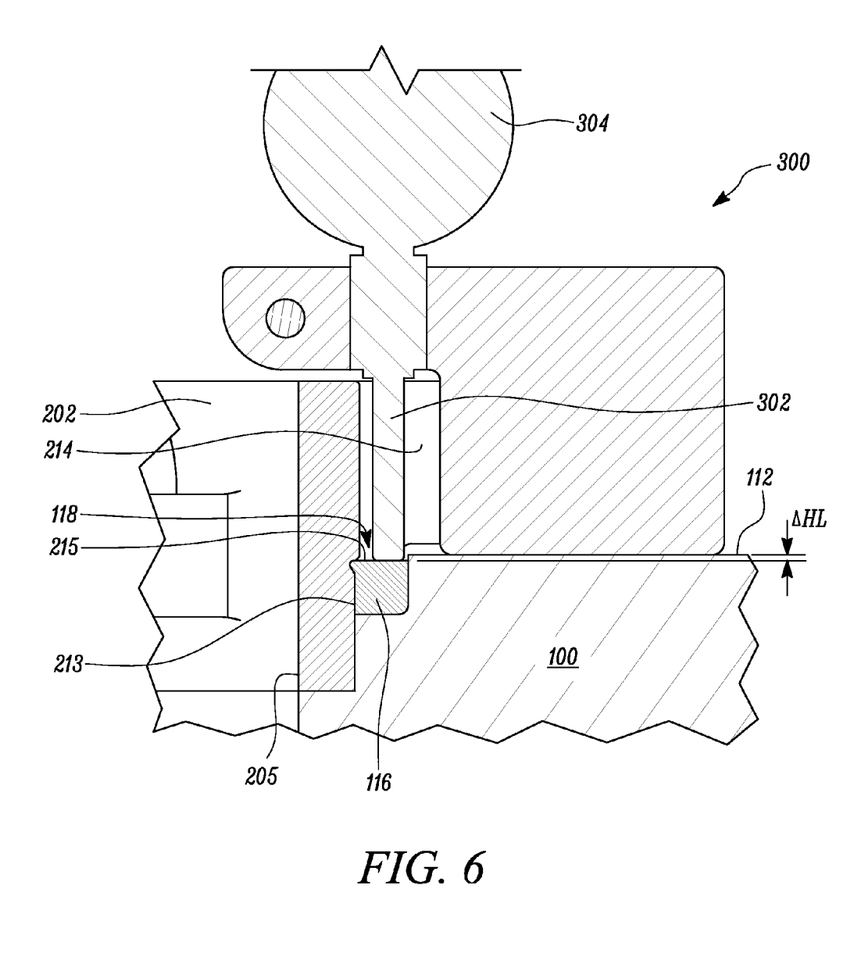
FIG. 6 is a partial sectional view of the system disposed on the cylinder block of FIG. 4, according to an embodiment of the present disclosure.

FIG. 4 illustrates a system 200 disposed on the cylinder block 100, according to an embodiment of the present disclosure. FIG. 5 illustrates a perspective view of a fixture 202 of the system 200, according to an embodiment of the present disclosure. FIG. 6 illustrates a sectional view of the system 200 disposed on the cylinder block 100, according to an embodiment of the present disclosure. The system 200 is structured to determine a height $\Delta H$ of the insert 116 relative to the top deck surface 112 as illustrated. Further, the system 200 and an exemplary implementation thereof are explained with reference to FIGS. 4 to 6.

The system 200 includes a fixture 202 and a dial gauge 300. The fixture 202 defines a central opening 204 therethrough. The fixture 202 may also include a handle 206 disposed in the central opening 204.

The fixture 202 may include a flange member 208 that is circumferentially disposed about the central opening 204. The flange member 208 may define multiple apertures 212 (FIG. 5) that are configured to receive fasteners 210 therein. In the illustrated embodiment, the flange member 208 defines four apertures 212 that are substantially equidistant from each other. Further, the apertures 212 may also be spaced at an equal distance from a central axis defined by the central opening 204. The fixture 202 further includes a shoulder portion 205 encircling the central opening 204 and extending from the flange member 208. The shoulder portion 205 may be configured to be inserted within the cylinder bore 106 and act as a cylinder liner once the fixture 202 is detachably attached to the top deck surface 112.

The fixture 202 may be positioned on the top deck surface 112 such that each of the apertures 212 align with the corresponding attachment bores 108 defined in the cylinder block 100. The fixture 202 may be detachably attached to the top deck surface 112 via the fasteners 210 passing through the apertures 212 and the corresponding attachment bores 108. In the illustrated embodiment, the fasteners are bolts 210. A washer (not shown) may also be provided with each of the fasteners 210. The flange member 208 may abut an inner surface 213 of the insert 116 upon positioning the fixture 202 on the top deck surface 112. Upon tightening the fasteners 210, the fixture 202 applies a force on the top deck surface 112 of the cylindrical block 100 and consequently the insert 116. The force may depend on a torque provided on each of the fasteners 210. The force applied by the fixture 202 may simulate a force applied by a cylinder liner on the insert 116.

The fixture 202 also defines multiple notches 214 that are circumferentially spaced on the fixture 202. In the illustrated embodiment, the notches 214 are symmetrically disposed on the flange member 208 between two adjacent apertures 212. The notches 214 may have an arcuate shape. Further, upon positioning the fixture 202 on the top deck surface 112, each of the notches 214 allows access to corresponding portions 215 of the upper surface 118 of the insert 116.

The dial gauge 300 may be used to measure a variation in length related parameters for an object. The dial gauge 300 includes a probe 302 that may be positioned in contact with the object. The dial gauge 300 further includes a display 304 that facilitates readout of the measured variation. The display 304 may be configured for analog or digital readout of the measured variation. The dial gauge 300 is for illustrative purposes only and alternative examples of the dial gauge 300 may include a probe 302 indicator, a pointer, a test indicator, a drop indicator, a plunger indicator, and the like.

In the illustrated embodiment, the dial gauge 300 is utilized to determine the height $\Delta H$ of the upper surface 118 of the insert 116 relative to the top deck surface 112. The height may be indicative of a drop in position of the upper surface 118 of the insert 116 due to application of the force by the fixture 202. Accordingly, the dial gauge 300 is disposed on the top deck surface 112 and adjacent to one of the multiple notches 214. Further, the probe 302 is inserted through the notch 214 so as to contact the corresponding portion 215 of the upper surface 118 of the insert 116. With such a configuration, the dial gauge 300 determines a local height $\Delta HL$ of the upper surface 118 of the insert 116 relative to the top deck surface 112. Specifically, the local height $\Delta HL$ corresponds to the portion of the upper section 102 accessible through the notch 214. Further, the local height $\Delta HL$ may be indicative of a depression in height of the corresponding portion of the upper surface of the insert 116 due to application of the force by the fixture 202.

Similarly, the dial gauge 300 may be suitably positioned to determine local heights $\Delta HL$ of the other portions 215 of the upper surface 118. Further, the height $\Delta H$ of the upper surface 118 of the insert relative to the top deck surface 112 may be determined based on the local heights $\Delta HL$. In an example, a highest value among the local heights $\Delta HL$ may indicate the height $\Delta H$ of the upper surface 118 of the insert 116 with respect to the top deck surface 112. In another example, an average value of the local heights $\Delta HL$ may indicate the height $\Delta H$ of the upper surface 118 of the insert with respect to the top deck surface 112.

The local height $\Delta HL$, as illustrated in FIG. 6, is for illustrative purposes only. It may be contemplated that the local height $\Delta HL$ may be substantially zero or within a tolerance value after the machining operation A person of ordinary skill in the art will acknowledge that the system 200 described herein is exemplary and non-limiting of this disclosure. It may be contemplated to modify the system 200 by adding, removing and/or modifying one or more components of the system 200 depending on a shape and/or dimensions of the cylinder block 100. For example, though the number of notches 214 shown in FIGS. 3 and 4 are four, the fixture 202 may include any number of notches 214 as per requirements. Further, a shape of the notches 214 may be varied.

Although the system 200 is explained in conjunction with the cylindrical block 100, one of ordinary skill in the art will acknowledge that embodiments of the present disclosure may be similarly applied to or implemented with any other machine component having an insert 116. In an example, the system 200 may be suitably employed to determine a height of an upper surface of a motor mount insert 116.

INDUSTRIAL APPLICABILITY

For the purposes of assembly, remanufacturing, repair, and the like, machine components such as, the cylindrical block 100 may be inspected. In some cases, the top deck surface 112 of the cylinder block 100 may undergo wear during usage. In a typical remanufacturing process, the counterbore 114 may be machined around the worn portion and the insert 116 may be press-fitted into the counterbore 114. Subsequently, a machining process may be performed to make all the surfaces flush with each other. However, there is a possibility of the gap 113 may exist between the insert 116 and a bottom surface of the counterbore 114. The system 200 may be used to determine the gap 113 that is indicated by the height $\Delta H$ of the upper surface 118 of the insert 116 relative to the top deck surface 112. As discussed above, the height $\Delta H$ may appear due to application of force by the fixture 202.

Figure 7:
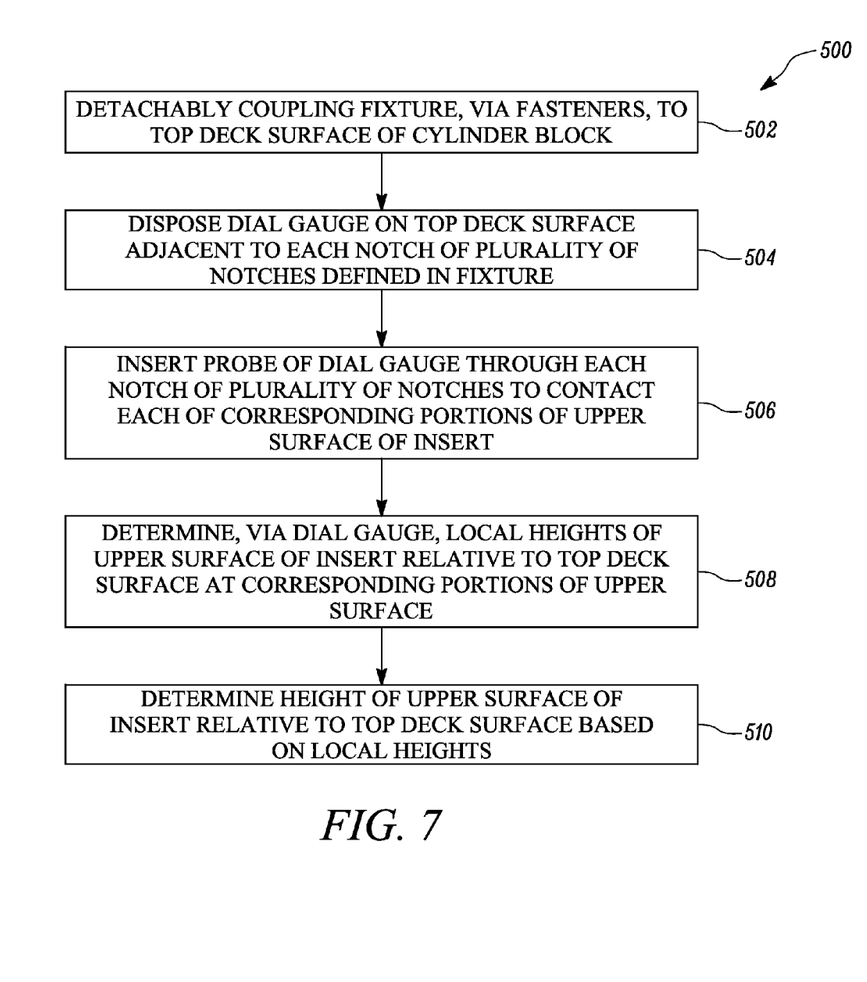
FIG. 7 is a flowchart of a method for determining a height of an upper surface of the insert relative to a top deck surface of the cylinder block of FIG. 6, according to an embodiment of the present disclosure.

The present disclosure is also related to a method 500 of determining the height $\Delta H$ of the upper surface 118 of the insert 116 relative to the top deck surface 112 of the cylinder block 100. In an embodiment, the system 200 may be used to implement one or more steps of the method. At step 502, the method includes detachably coupling the fixture 202, via the fasteners 210 to the top deck surface 112 of the cylinder block 100. The fixture 202 is assembled to apply an axial force on the upper surface 118 of the insert 116 in the coupled position.

At step 504, the method 500 includes disposing the dial gauge 300 on the top deck surface 112 adjacent to each of the notches 214 defined in the fixture 202. The plurality of notches 214 are circumferentially spaced on the fixture 202 to allow access to corresponding portions 215 of the upper surface 118 of the insert 116.

At step 506, the method 500 includes inserting the probe 302 of the dial gauge 300 through each of the notches 214 to contact each of the corresponding portions 215 of the upper surface 118 of the insert 116. At step 508, the method 500 includes determining, via the dial gauge 300, the local heights $\Delta HL$ of the upper surface 118 of the insert 116 relative to the top deck surface 112 at the corresponding portions 215 of the upper surface 118. The steps 502, 504, 506 may be repeated with each of the notches 214 to determine corresponding local heights $\Delta HL$.

At step 510, the method includes determining the height $\Delta H$ of the upper surface 118 of the insert 116 relative to the top deck surface 112 based on the local heights $\Delta HL$. In various examples, the height $\Delta H$ may be the average or the maximum of the local heights $\Delta HL$.

As described above, the system 200 and the method 500 enables convenient detection of the height $\Delta H$ of the insert 116 with respect to the top deck surface 112. The system 200 and the method 500 may simulate a force applied on the insert 116 by a cylinder liner. Therefore, any unintended movement of the insert 116 may be detected before the cylinder liner and an adjoining spacer (not shown) is installed. In case the height $\Delta H$ deviates from a tolerance limit, the insert 116 may be easily replaced or an auxiliary machining performed without removal and re-installation of any other components. The notches 214 of the fixture 202 may also allow determination of the local heights $\Delta HL$ at the corresponding portions 215 of the upper surface 118 of the insert 116. Therefore, any variation in the local heights $\Delta HL$ of the insert 116 may be considered in the determination of the height $\Delta H$. The variation in the local heights $\Delta HL$ may be due to slanting of the insert 116 within the counterbore 114.

Although the method 500 is explained in conjunction with the cylinder block 100 and the worn surface defined on the top deck surface 112, one of ordinary skill in the art will acknowledge that embodiments of the present disclosure may be similarly applied to or implemented in any other machine component having one or more worn surfaces.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of determining a height of an upper surface of an insert relative to a top deck surface of a cylinder block of an engine, the insert being disposed in a counterbore formed adjacent to an end of a cylinder bore defined in the cylinder block, the method comprising:

detachably coupling a fixture, via fasteners, to the top deck surface of the cylinder block, wherein the fixture is structured and arranged to apply an axial force on the upper surface of the insert in the coupled position;

disposing a dial gauge on the top deck surface adjacent to each notch of a plurality of notches defined in the fixture, wherein the plurality of notches are circumferentially spaced on the fixture to allow access to corresponding portions of the upper surface of the insert;

inserting a probe of a dial gauge through each notch of the plurality of notches to contact each of the corresponding portions of the upper surface of the insert;

determining, via the dial gauge, local heights of the upper surface of the insert relative to the top deck surface at the corresponding portions of the upper surface; and     determining the height of upper surface of the insert relative to the top deck surface based on the local heights.

\* \* \* \* \*